Feb. 14, 1939.                F. W. JACKMAN                2,147,038
                    APPARATUS FOR TRICK PHOTOGRAPHY
                        Filed Nov. 25, 1935            2 Sheets-Sheet 1

INVENTOR.
FRED W. JACKMAN
BY
W E Beatty
ATTORNEY

Feb. 14, 1939.  F. W. JACKMAN  2,147,038
APPARATUS FOR TRICK PHOTOGRAPHY
Filed Nov. 25, 1935  2 Sheets-Sheet 2
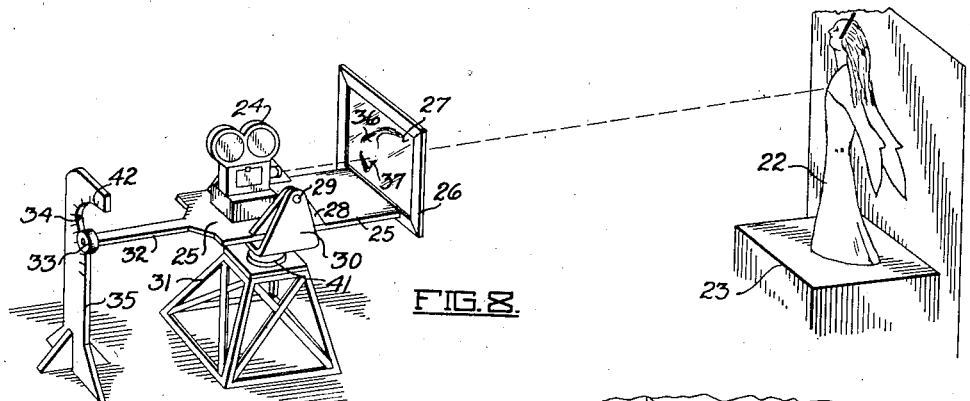
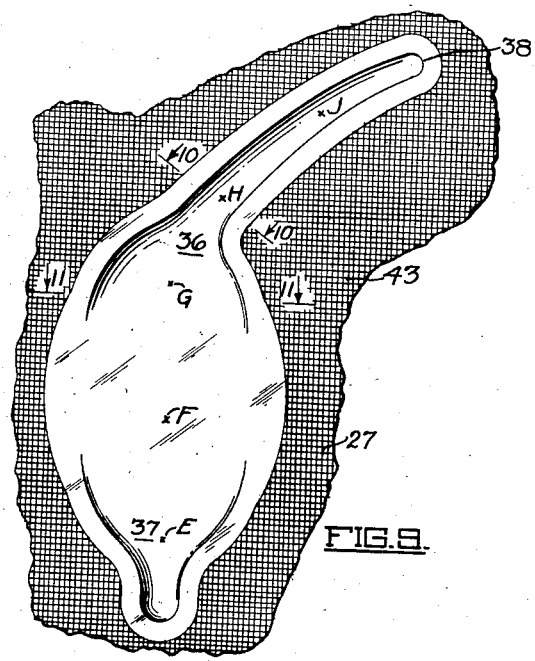
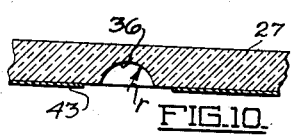
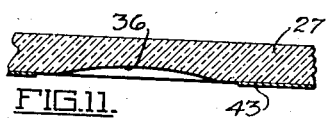
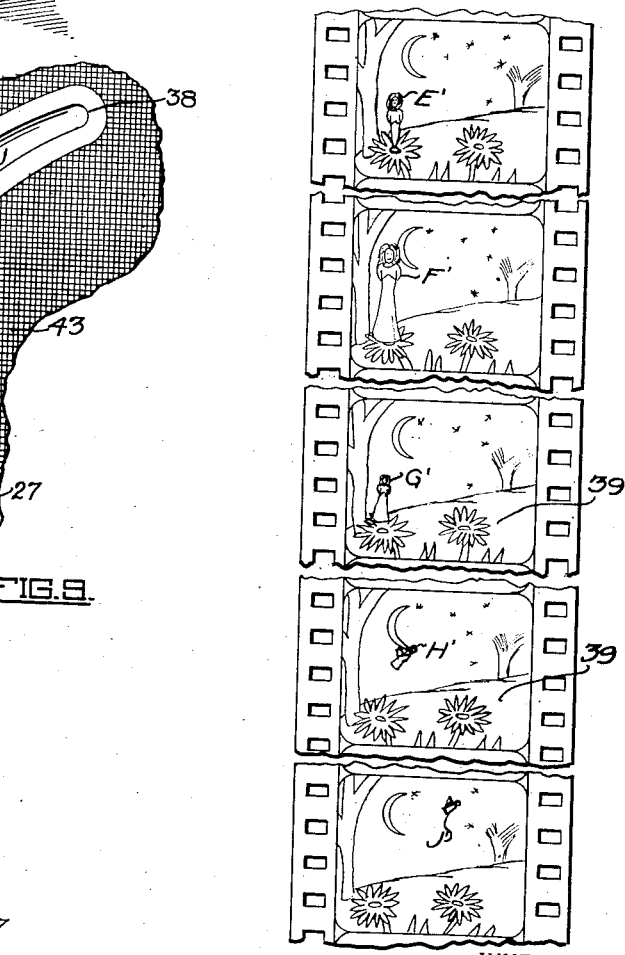
INVENTOR.
FRED W. JACKMAN
BY
W E Beatty
ATTORNEY Patented Feb. 14, 1939

2,147,038

UNITED STATES PATENT OFFICE 2,147,038

APPARATUS FOR TRICK PHOTOGRAPHY

Fred W. Jackman, Beverly Hills, Calif., assignor to Warner Bros. Pictures, Inc., New York, N. Y., a corporation of Delaware Application November 25, 1935, Serial No. 51,415

1 Claim. (Cl. 88—16)

This invention relates to motion picture photography and particularly to trick photography.

In motion picture photography, it is at times desirable to depict an object or objects as gradually appearing or disappearing from sight. For example, it may be desired to show a girl appearing to grow from a tiny spot of light into a full sized form or vice versa. Again, it may be desired to gradually reduce or distort a scene such as a landscape into a spot of light, or other form, or it may be made to disappear entirely.

The present invention has for an object to distort the image of a part or all of an object.

This is accomplished by interposing between the object and the camera, or other image recording device, an image distorting member which is unsymmetrical. The distorting member may take the form of a body of transparent material such as glass having an irregular light refracting surface thereon which is adapted to distort the image of an object passing therethrough.

Another object of the invention is to give the illusion of an object or objects diminishing or growing in size.

This is accomplished by providing the distorting member with a concave or convex surface which gradually changes in curvature. That is, the distorting member may be of glass having a groove on the surface thereof, one portion of which is semi-circular in cross section. An object when viewed through this part of the groove would be distorted and would be seen only as a point of light. The radius of the cross section of the groove gradually increases along its length until the center of radius is at infinity at which point the image when viewed through the glass would be a clear undistorted representation of the object. If, during the photographing of the object, the distorting member is moved in a path crossing the optical axis of the camera, starting first at the deeply grooved portion, the object will appear to grow from a point of light to a full sized undistorted figure. The distorting surface may take various forms and dimensions so as to produce various effects. For instance, there may be a number of distorting surfaces which merge into one, or the distorting surface may have its radius of curvature gradually increase from a semi-circular groove to a flat surface and then decrease again to a semi-circular groove. This would cause the object thus viewed through the distorting member, as it was moved across the line of sight, to gradually appear from a spot of light and then gradually disappear. Also, the distorting surface may take a form different from that produced by an arc of a circle, that is, it may be semi-oval in cross section, etc.

A further object of the invention is to distort the image of an object and while thus distorted to depict movement of the object across the field of view.

This is accomplished by providing the distorting member with an irregular arcuate light directing groove which curves in the plane of the distorting member. Both the distorting member and the camera are secured integral with each other and are universally movable. The camera and distorting member are moved so as to photograph the image along the length of the groove, thus always keeping the groove in line with the subject being photographed.

The illusion of change in size or form may be accomplished by movement of any of the three elements viz., the camera, the distorting element, or the object to be photographed. Preferably, however, the object is allowed to be stationary, or as in the case of the object being a dancer, the stage on which she is dancing is held stationary.

For further details of the invention reference is to be had to the accompanying drawings in which:

Fig. 8 is a diagrammatic perspective view showing a modification of the arrangement shown in Fig. 1.

Fig. 9 is an elevational view with parts broken off of the glass distortion member shown in the arrangement of Fig. 8.

Fig. 10 is a sectional plan view taken along the line 10—10 of Fig. 9.

Fig. 11 is a sectional view taken along the line 11—11 of Fig. 9.

Fig. 12 is a view showing a series of sections of a motion picture film comprising a composite picture, the foreground or action of which is produced by the apparatus shown in Fig. 8.

Figure 1:
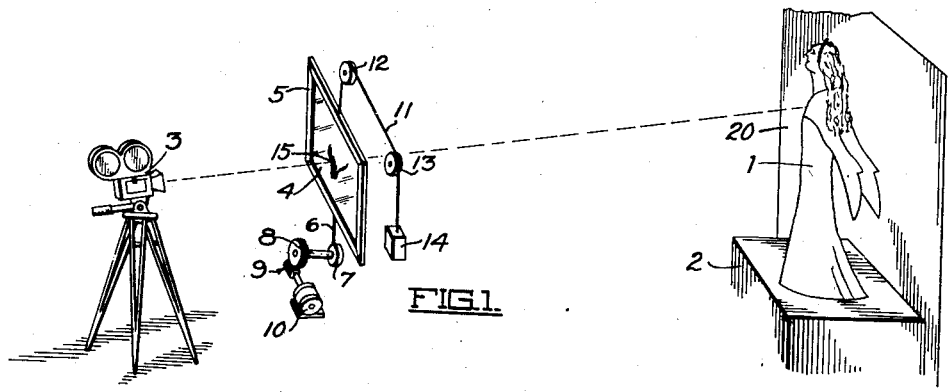
Fig. 1 is a diagrammatic view in perspective showing an arrangement for photographing an object so as to show it as gradually diminishing or increasing in size.
Figure 2:
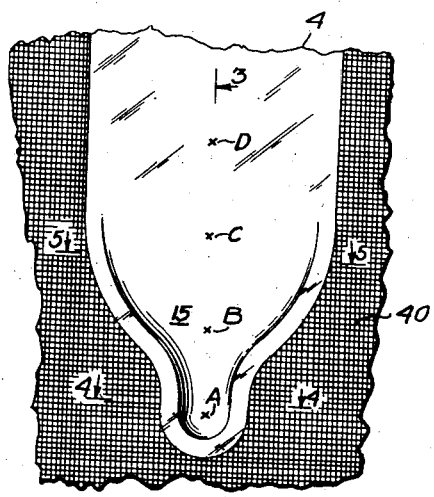
Fig. 2 is an elevational view of the glass distorting member.
Figure 3:
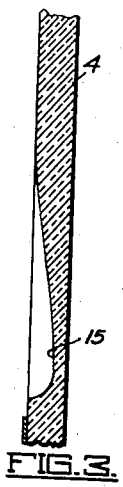
Fig. 3 is a sectional elevational view with parts broken away taken along the line 3—3 of Fig. 2.

Referring now to Fig. 1, the object 1 represented as an actress in the form of a fairy is placed upon a stage or platform 2. A motion picture camera 3 is focused upon the actress 1. Interposed between the actress 1 and camera 3 is a distorting member in the form of a glass plate 4 mounted in a frame 5. A flexible rope or chain 6, fastened at one end to the lower portion of the frame 5, is passed around a sheave 7 on the end of a shaft 8. The sheave 7 is rotated through a worm gear arrangement 9 by means of a motor 10. Rotation of the motor one way or the other causes the plate 4 to be moved either up or down as desired. A rope or chain 11 secured to the upper part of the frame 5 is passed over idler pulleys 12 and 13 and is provided on its free end with a counterweight 14. For the sake of clearness, guideways for the frame 5 and other ancillary equipment, which form no part of the present invention, have been omitted.

Figure 6:
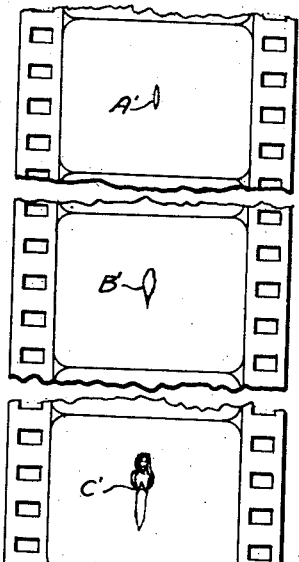
Fig. 6 is a view showing several sections of a motion picture film having a gradually increasing image thereon as produced by the apparatus shown in Fig. 1.
Figure 6:
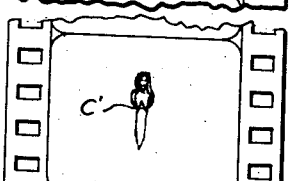
Figure 6:
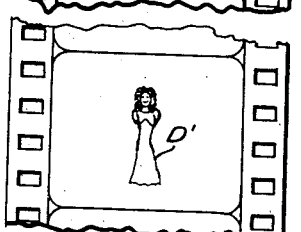
Figure 4:
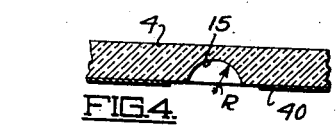
Fig. 4 is a sectional plan view taken along the line 4—4 of Fig. 2.
Figure 5:
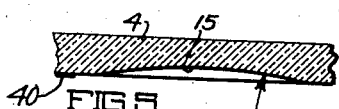
Fig. 5 is a sectional plan view taken along the line 5—5 of Fig. 2.

Referring now to Figs. 2 to 5, inclusive, the glass plate 4 is shown as having an indentation 15 in the center thereof of a desired shape which may be formed by grinding with emery or other suitable abrasive and then polishing. The lower part of the indentation 15 (as at point A, Fig. 2) has a relatively small radius of curvature as shown by the radius R in Fig. 4. Consequently, the object 1 as viewed through the plate 4 at the point A would appear as a small spot of light such as represented at A' (Fig. 6). At the point B (Fig. 2) the radius of curvature of the indentation is somewhat longer thus resulting in a larger image as at B' (Fig. 6). At point C (Fig. 2) the radius of curvature is considerably longer as represented by R' (Fig. 5). This will result in a much larger image C' (Fig. 6) which will begin to take on form. At point D the radius of curvature becomes infinity, thus resulting in a clear, undistorted image D'. In combining the image produced by the object 1 with a background scene such as at 16 (Fig. 7) so as to obtain a composite picture upon the film, any suitable method may be used such as the color separation process, double exposure, double printing, etc., all of which are well known in the art.

Figure 7:
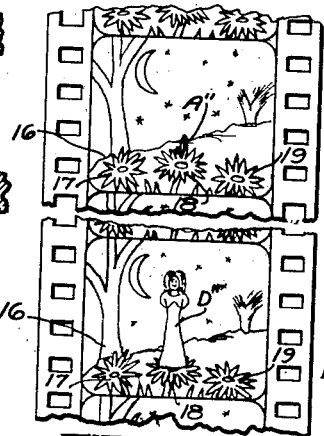
Fig. 7 is a view of a section of motion picture film showing a composite picture with the object represented in Fig. 6 as being combined with a background, such as a landscape.

In Fig. 7 the background scene 16 is shown as comprising a landscape having a group of flowers as at 17, 18, and 19 in the foreground. Out of one of the flowers, i. e. 18 the figure of a girl or fairy is to grow. The image starts as a small spot of light A" (corresponding to A' in Fig. 6) just above the central flower 18 and gradually grows to a clear undistorted image D" of the actress 1.

In producing a composite picture, the platform 2 (Fig. 1) and also a screen 20 provided directly behind the actress 1 is preferably provided with a non-actinic color such as black, or, blue, illuminated with yellow light, so as to allow only the image of the actress 1 to be impressed upon the sensitized film within the camera 3. Preferably, the surface of the glass plate 4 surrounding the indentation 15 is given an opaque coating 40 such as black paint to prevent any light from the set except that coming from the actress 1 from being admitted to the camera.

Referring now to Figs. 8–12, inclusive, I will now describe a modification of the arrangement shown in Fig. 1. The actress 22 is placed upon a stationary stage or platform 23. The motion picture camera 24 is secured upon a base 25 which carries at its forward end a frame 26 enclosing a glass plate 27. The base 25 has a pair of brackets 28 in either side thereof which are provided with trunnion bearings 29 at their upper ends. The bearings 29 are preferably on the same horizontal plane as the objective lens of the camera 24. The bearings 29 are journaled to the upper part of a large yoke 30 which is rotatably mounted at 41 upon a standard 31 for movement about a vertical axis. The base 25 has an extension 32 in its rear end which is provided with a cam following wheel 33 on the end thereof. The wheel 33 is adapted to engage a stationary cam surface 34 provided upon a standard 35.

Referring to Figs. 9–11, inclusive, the glass plate 27 has indented surfaces 36 and 37 provided near the center thereof. The indentation 37 is similar to that shown in Fig. 2. The indentation 36 starts with a radius of curvature at infinity which gradually grows smaller until the groove at point H is practically a semi-circle having a radius of curvature $r$ (Fig. 10). The groove at this point curves to one side and gradually becomes smaller, ending at 38. The groove in the lens of Fig. 9 is symmetrical along the path EFGHJ, and the cam surface 34 corresponds to this path. The surface of the plate 27 surrounding the indentations 36, 37, and the intervening portion, is coated as at 43 with an opaque paint to allow only light from the actress 22 to be reflected into the camera 24. The camera 24 and glass plate 27 are first so positioned that the lower portion of the indentation 37 is in line with the actress 22 and the camera 24. The camera 24 is then started and the base 25 slowly rotated in a clockwise direction about the trunnions 29, at the same time keeping the wheel 33 against the cam surface 34.

At the point E (Fig. 9) the image of the actress 22 will have partially grown to the form shown at E' (Fig 12). At F the surface of the plate 1 is flat thus allowing an undistorted full sized image F' of the actress to be recorded upon the film. At point G, the image is again reduced in size as at G' due to the decreasing of the radius of curvature.

As the camera 24 and plate 27 are further tilted about the trunnion 29, the wheel 33 follows the curved surface 34 thus causing the base 25 to also rotate about the vertical bearing 41. The line of sight between the actress 22 and camera 24 follows along the curved ground portion of the indentation 37 thus causing the image to travel across the film as at H' and J'. When the image thus formed is combined by any suitable method with a background scene as at 39 (Fig. 12) the movement of the image across the film gives the illusion of the girl or fairy flying into the distance across the landscape.

In order to properly time the movement of the camera 24 and plate 27, a scale 42 may be placed along the cam way 34 and thus allow the movement of the wheel to be timed by watch or other means.

Having thus described the invention, what is claimed as new and desired to secure by Letters Patent, is:

An apparatus for obtaining diminution and growth of an image of an object in successively different positions on successive film frames comprising a camera, a distorting lens intermediate said object and said camera, said lens having substantially symmetrical refraction along a path, means for varying the position of the point of intersection of a line connecting said object and said camera with said path, whereby the different points of intersection forming a line coincident with said path vary the size of the image of said object at a fixed position, means for guiding said camera to shift in the film frames the positions of the image thus distorted, said first and last mentioned means comprising a support for said camera and said distorting lens movable about mutually perpendicular axes, said support having an extension therefrom, a cam follower on said extension, and a cam having a surface corresponding to the path of said distorting lens.

FRED W. JACKMAN.